(12) United States Patent
Ninoyu et al.

(10) Patent No.: US 10,625,721 B2
(45) Date of Patent: Apr. 21, 2020

(54) HYDRAULIC PRESSURE CONTROL DEVICE

(71) Applicants: ADVICS CO., LTD., Kariya-shi, Aichi-ken (JP); TOYOTA JIDOSHA KABUSHIKI KAISHA, Toyota-shi, Aichi-ken (JP)

(72) Inventors: Masaki Ninoyu, Obu (JP); Takahiro Okano, Aichi-ken (JP); Masaaki Komazawa, Miyoshi (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 163 days.

(21) Appl. No.: 15/778,455

(22) PCT Filed: Nov. 24, 2016

(86) PCT No.: PCT/JP2016/084862
§ 371 (c)(1),
(2) Date: May 23, 2018

(87) PCT Pub. No.: WO2017/090697
PCT Pub. Date: Jun. 1, 2017

(65) Prior Publication Data
US 2018/0345925 A1    Dec. 6, 2018

(30) Foreign Application Priority Data
Nov. 27, 2015    (JP) .................................. 2015-232261

(51) Int. Cl.
*B60T 8/36*    (2006.01)
*B60T 8/40*    (2006.01)
(Continued)

(52) U.S. Cl.
CPC ................ *B60T 8/36* (2013.01); *B60T 7/042* (2013.01); *B60T 8/40* (2013.01); *B60T 8/4077* (2013.01);
(Continued)

(58) Field of Classification Search
CPC . B60T 8/36; B60T 8/40; B60T 8/4077; B60T 13/145; B60T 13/686; F15B 9/09
See application file for complete search history.

(56) References Cited

U.S. PATENT DOCUMENTS 9,403,517 B2 * 8/2016 Kernwein ............. B60T 13/665
10,029,662 B2 * 7/2018 Ninoyu ................. B60T 13/686
(Continued)

FOREIGN PATENT DOCUMENTS

JP    2005-35471 A    2/2005
JP    2008-290487 A    12/2008
(Continued)

OTHER PUBLICATIONS

International Search Report (PCT/ISA/210) dated Feb. 21, 2017, by the Japanese Patent Office as the International Searching Authority for International Application No. PCT/JP2016/084862.

*Primary Examiner* — Michael Leslie
(74) *Attorney, Agent, or Firm* — Buchanan Ingersoll & Rooney PC

(57) ABSTRACT

The hydraulic pressure control device has an idle region, and is provided with a control portion, and a correcting portion which, in cases when the reaction time of the actual pressure to pressure increasing control or pressure decreasing control exceeds a predetermined threshold time, corrects a control current towards the side in which the flow-rate is increased. In cases when a judging portion has judged that the pressure increasing control is in the idle area, the correcting portion applies, as the threshold time, an idle threshold time set to (Continued)

a value different from the threshold time that in cases when the judging portion has not judged that the pressure increasing control is in the idle area. Furthermore, in cases when the reaction time of the actual pressure to the pressure increasing control exceeds the idle threshold time, the correcting portion corrects the control current.

6 Claims, 9 Drawing Sheets

(51) Int. Cl.
  *B60T 7/04* (2006.01)
  *B60T 13/66* (2006.01)
  *B60T 13/68* (2006.01)
  *B60T 13/14* (2006.01)
  *F15B 9/09* (2006.01)

(52) U.S. Cl.
  CPC ............ *B60T 13/14* (2013.01); *B60T 13/145* (2013.01); *B60T 13/662* (2013.01); *B60T 13/686* (2013.01); *F15B 9/09* (2013.01)

(56) References Cited

U.S. PATENT DOCUMENTS

| | | | | |
|---|---|---|---|---|
| 10,407,036 | B2* | 9/2019 | Okano | ............ B60T 8/34 |
| 2018/0319383 | A1* | 11/2018 | Okano | ............ B60T 7/042 |
| 2019/0016317 | A1* | 1/2019 | Masuda | ............ B60T 8/17 |
| 2019/0077385 | A1* | 3/2019 | Okano | ............ B60T 8/1701 |

FOREIGN PATENT DOCUMENTS

| | | |
|---|---|---|
| JP | 2010-221882 A | 10/2010 |
| JP | 2015-150970 A | 8/2015 |

* cited by examiner

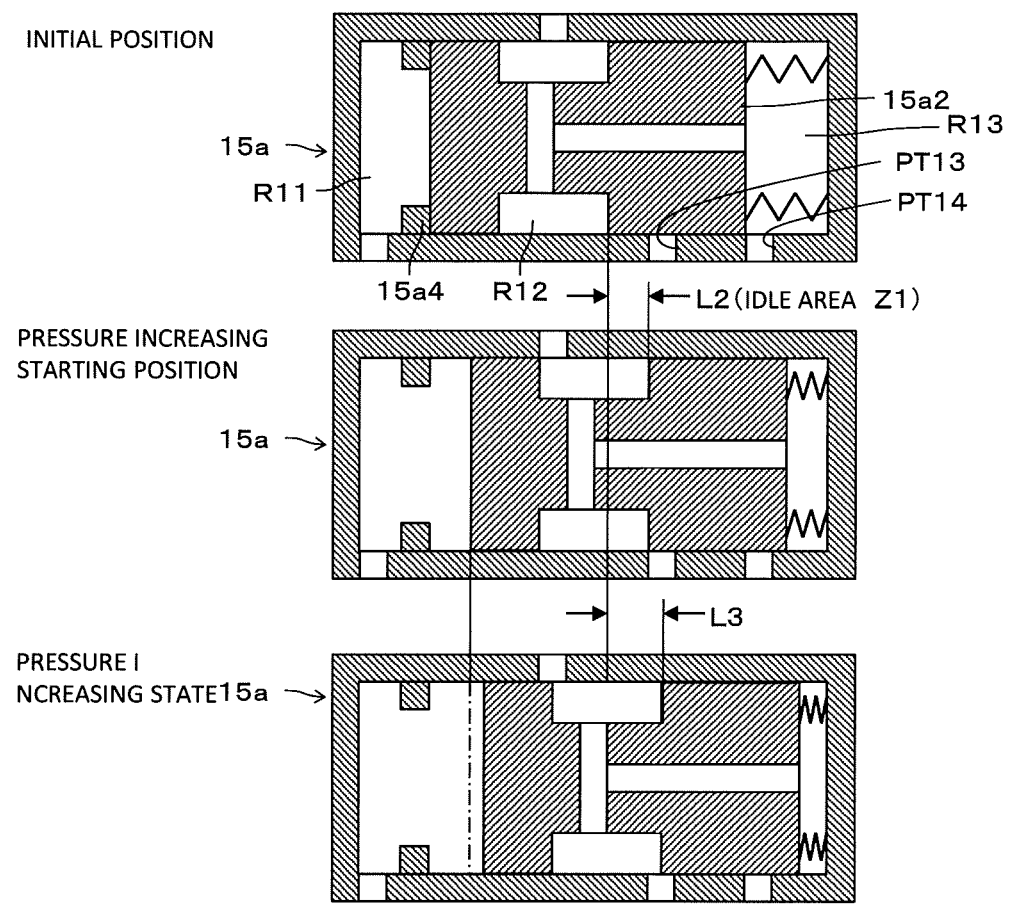

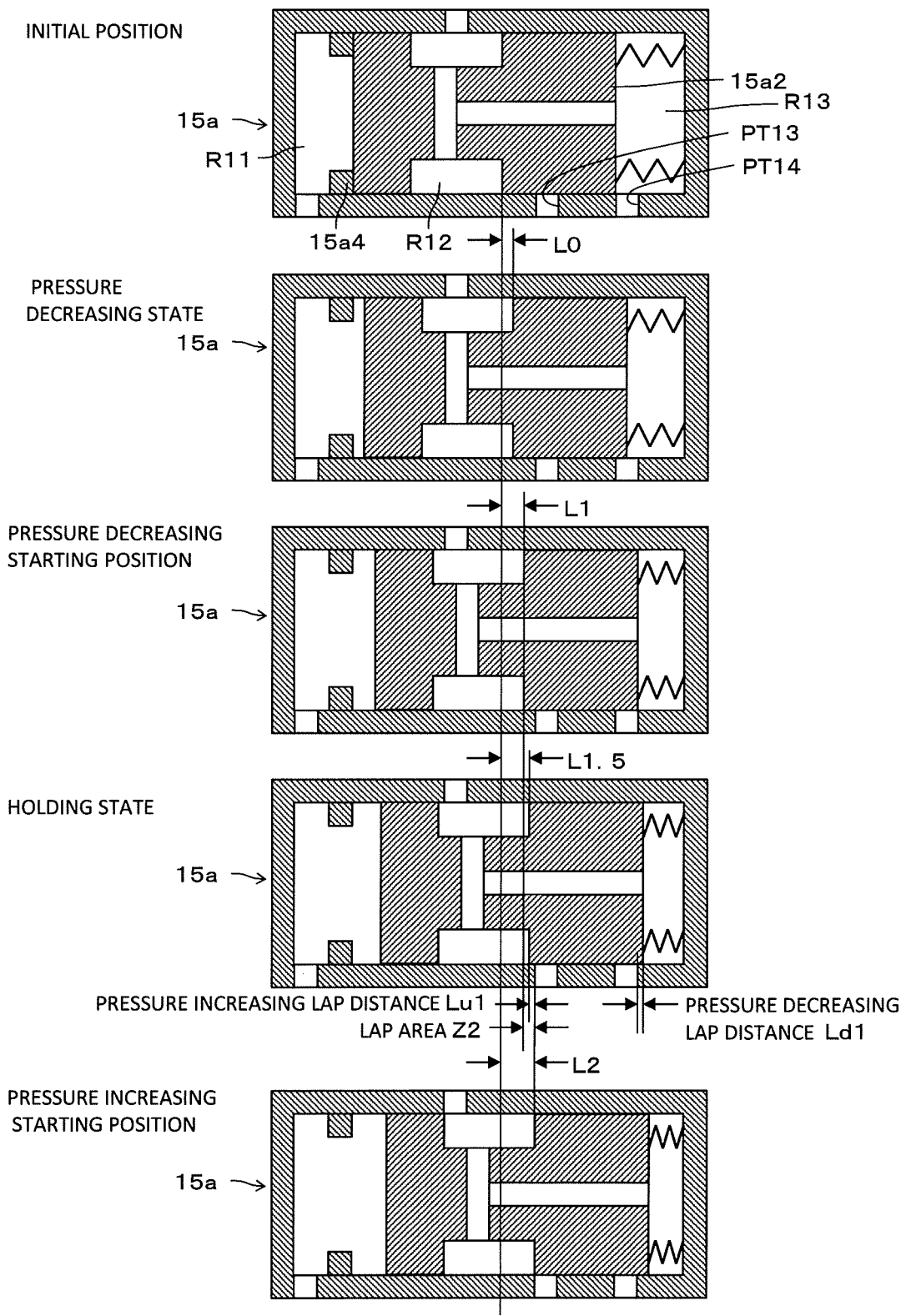

HYDRAULIC PRESSURE CONTROL DEVICE

TECHNICAL FIELD

This invention relates to a hydraulic pressure control device.

BACKGROUND ART

The hydraulic pressure control device is applied to a vehicle braking device and executes for example, controlling of an actual hydraulic pressure (actual pressure) to approximate the target hydraulic pressure (target pressure) determined in response to the braking operation of the driver of the vehicle. The hydraulic pressure is a pressure in a hydraulic pressure chamber associated with the braking force. The hydraulic pressure control device mainly includes a valve portion and a control portion. The control portion outputs a control current to an electromagnetic valve provided in the valve portion and adjusts the flow-rate of fluid (inflowing or outflowing amount of fluid) at the valve portion. The actual pressure is adjusted in response to the flow-rate of the fluid at the valve portion. The hydraulic pressure control device corrects the control current relative to the required flow-rate of the fluid at the valve portion (required flow-rate) when the response of the actual pressure delays beyond a permissible range of time, i.e., when the reaction time of the actual pressure exceeds a predetermined time in the pressure increasing control or the pressure decreasing control. For example, the hydraulic pressure control device corrects the valve opening current of an electromagnetic valve in order to keep the reaction time within the permissible range of time. The control current for opening the electromagnetic valve does not necessarily agree with the actual value set at the factory or the like and accordingly, the correction is necessary in operation.

As an example, Japanese Patent Publication JP2008-290487 discloses a brake control device.

CITATION LIST

Patent Literature

[Patent Literature 1] JP 2008-290487A

SUMMARY OF INVENTION

Technical Problem(s)

It is noted here that depending on the structure of the valve portion or the hydraulic pressure chamber, there exists a hydraulic pressure control device which has an idle area (invalid area) in which a pressure increasing control does not have influence on the actual pressure when the pressure increasing control is executed from an initial state. In such idle area, different from other areas, the above correction cannot be properly executed due to a time period when the actual pressure does not react, regardless of the state of the electromagnetic valve whether it is open or not.

Accordingly, this invention was made in consideration with the above-mentioned situation and the objective of the invention is to provide a hydraulic pressure control device which can correct the control current, considering the existence of the idle area.

Solution to Problem(s)

The hydraulic pressure control device associated with the invention includes a valve portion which adjusts a flow-rate of a fluid relative to a hydraulic pressure chamber, a control portion which sets a target pressure which is a target value of a hydraulic pressure in the hydraulic pressure chamber and outputs a control current corresponding to the flow-rate to the valve portion so that an actual pressure which is an actual value of the hydraulic pressure in the hydraulic pressure chamber approximates the target pressure and a correcting portion which corrects the control current toward an increasing side in which the flow-rate increases when a reaction time of the actual pressure relative to a pressure increasing control which controls the actual pressure to increase or a pressure decreasing control which controls the actual pressure to decrease, exceeds a predetermined threshold time, wherein an idle area is provided in which the actual pressure is not affected by the pressure increasing control when the pressure increasing control is executed from an initial state of the hydraulic pressure chamber or the valve portion. The hydraulic pressure control device further includes a judging portion which judges whether the pressure increasing control is executed in the idle area or not, wherein in a case in which the pressure increasing control is judged to be executed in the idle area by the judging portion, as the threshold time, the correcting portion adopts an idle threshold time which is set to be a value different from the threshold time in a case in which the pressure increasing control is not judged to be executed in the idle area by the judging portion and executes a correction of the control current when the reaction time of the actual pressure relative to the pressure increasing control exceeds the idle threshold time.

Effect of Invention

According to the invention, the threshold time is set to the idle threshold time which is different form the threshold time of other areas. In other words, according to the invention, apart from a normal threshold time, it is possible to set a threshold time, considering the area (idle area) in which the actual pressure does not react. Thus, more appropriate correction of the control current can be possible depending on the situations.

BRIEF EXPLANATION OF ATTACHED DRAWINGS

FIG. 2A is an explanatory view explaining an operation of the regulator according to the embodiment;

FIG. 2B is an explanatory view explaining an operation of the regulator according to the embodiment;

EMBODIMENTS FOR IMPLEMENTING INVENTION

Figure 1:
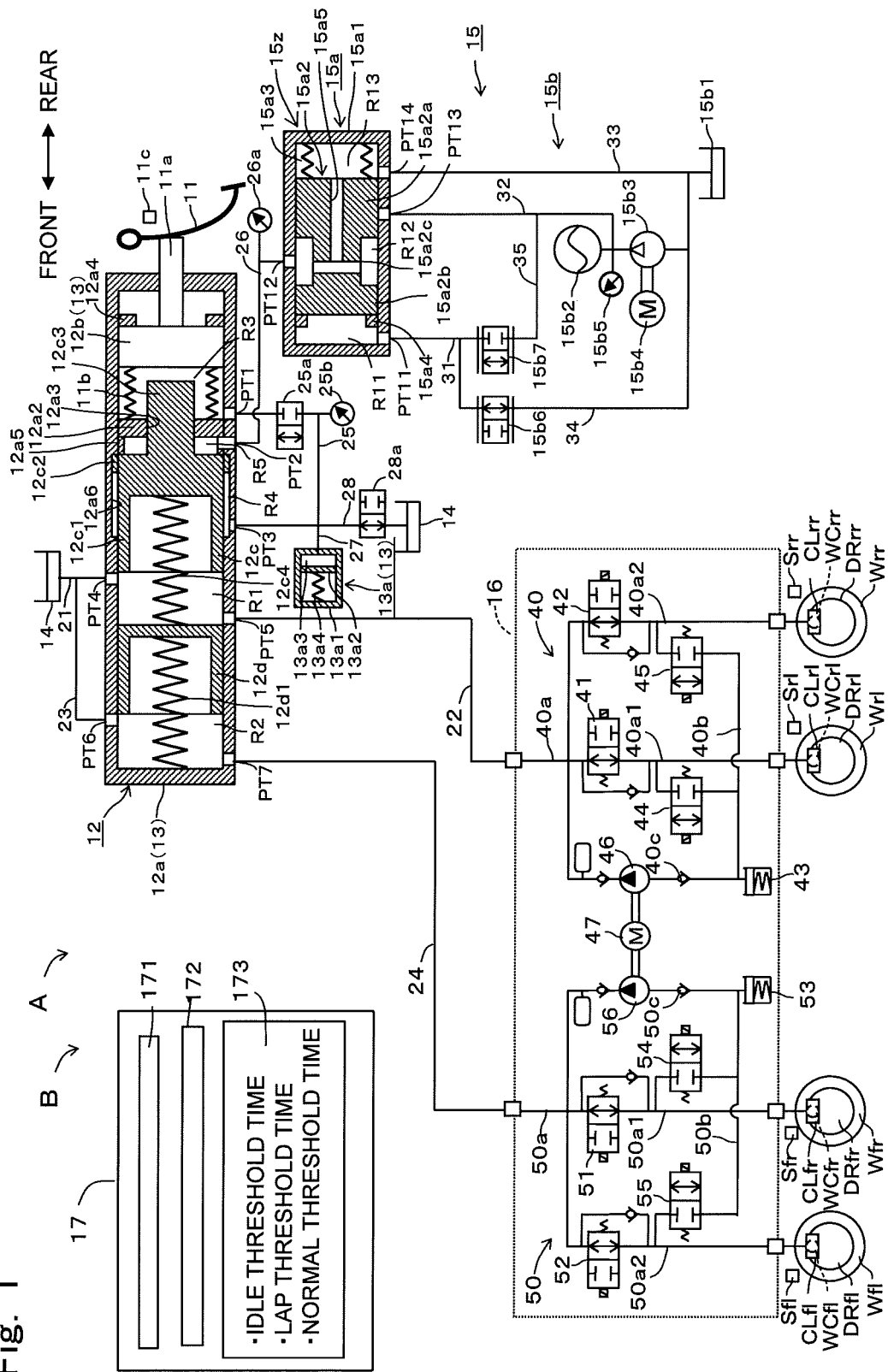
FIG. 1 is a structural view of the hydraulic pressure braking force generating device according to an embodiment of the invention.

The hydraulic pressure control device applied to a vehicle according to an embodiment will be explained with reference to the attached drawings. The vehicle is equipped with a hydraulic pressure braking force generating device A which applies hydraulic pressure braking force to the vehicle by directly applying the hydraulic pressure braking force to each wheel W (Wfl, Wfr, Wrl and Wrr). As shown in FIG. 1, the hydraulic pressure braking force generating device A includes a brake pedal 11, a master cylinder 12, a stroke simulator portion 13, a reservoir 14, a booster mechanism 15, an actuator 16, a brake ECU 17 and a wheel cylinder WC. The hydraulic pressure control device B according to the embodiment at least includes a part of the booster mechanism 15 (later explained regulator 15a, pressure decreasing valve 15b6 and pressure increasing valve 15b7) and the brake ECU 17. The brake ECU 17 is an electronic control unit equipped with CPU and memories.

The wheel cylinder WC restricts the rotation of the vehicle wheel W and is provided at the caliper CL. The wheel cylinder WC functions as a braking force applying mechanism which applies braking force to the vehicle wheel W based on the pressure of brake fluid (brake hydraulic pressure) from the actuator 16. When the brake hydraulic pressure is applied to the wheel cylinder WC, each piston (not shown) of the wheel cylinder WC pushes a pair of brake pads (not shown) which is the friction member to sandwich and squeeze a disc rotor DR which is a rotational member rotating unitary with the vehicle wheel W at both sides of the rotor DR to thereby restrict the rotation of the rotor. Detection signal is inputted to the brake ECU 17 from each wheel speed sensor S independently arranged at respective wheel cylinders WC. In this embodiment, a disc type brake system is adopted, but a drum type brake system can be adopted.

The brake pedal 11 is a brake operating member and is connected to the stroke simulator 13 and the master cylinder 12 via the operating rod 11a.

A pedal stroke sensor 11c is provided in the vicinity of the brake pedal 11 for detecting a brake pedal stroke (hereinafter referred to as operating amount or the stroke) which indicates a brake operating state generated by the depression of the brake pedal 11. The brake pedal stroke sensor 11c is connected to the brake ECU 17 to output the detection signal (detection result) to the brake ECU 17.

The master cylinder 12 supplies the brake fluid with the actuator 16 in response to the operating amount of the brake pedal 11 (brake operating member) and is formed by a cylinder body 12a, an input piston 12b, a first master piston 12c and a second master piston 12d, etc.

The cylinder body 12a is provided in a substantially bottomed cylindrical shape. A partition wall portion 12a2 is provided on the inner peripheral portion of the cylinder body 12a and is projecting inwardly in a flange shape. A through-hole 12a3 is formed at the central portion of the partition wall portion 12a2 and is penetrating therethrough in a front/rear direction. In the inner peripheral portion of the cylinder body 12a, the first and the second master pistons 12c and 12d are arranged in a frontward portion with respect to the partition wall portion 12a2 and are liquid-tightly and movably formed along in a front/rear direction.

In the inner peripheral portion of the cylinder body 12a, an input piston 12b is arranged at a rearward portion of the partition wall portion 12a2 and is liquid-tightly and movably formed along in an axial direction. The input piston 12b slidably moves within the cylinder body 12a in response to the operation of the brake pedal 11.

The input piston 12b is connected to the operating rod 11a which moves in association with the movement of the brake pedal 11. The input piston 12b is biased by a compression spring 11b in a direction where the volume of the first hydraulic pressure chamber R3 is expanded, i.e., in a rearward direction (right direction as vied in the drawing). When the brake pedal 11 is depressed, the operating rod 11a moves forward against the biasing force of the compression spring 11b. Along with the advancement of the operating rod 11a, the input piston 12b also advances in conjunction. When the depression of the brake pedal 11 is released, the input piston 12b retreats by the biasing force of the compression spring 11b until it contacts with a restriction projecting portion 12a4 and is positioned thereby.

The first master piston 12c is formed by a pressurizing cylindrical portion 12c1, a flange portion 12c2 and a projecting portion 12c3 as a unit. The pressurizing cylindrical portion 12c1 is formed in a substantially bottomed cylindrical shape having an opening at the front side and is disposed in the cylinder body 12a to liquid-tightly slide relative to the inner peripheral surface thereof. A coil spring 12c4 which is a biasing member is disposed in an inner space of the pressurizing cylindrical portion 12c1 between the second master piston 12d and the inner space of the pressurizing cylindrical portion 12c1. The first master piston 12c is biased in a rearward direction by the coil spring 12c4. In other words, the first master piston 12c is biased in a rearward direction by the coil spring 12c4 and eventually is brought into contact with the restriction projecting portion 12a5 to be positioned thereby. This position of the first master piston 12c is defined as the initial position (predetermined in advance) at the time when the depression operation of the brake pedal 11 is released.

The flange portion 12c2 is a cylindrical portion projecting outward in the radial direction from the outer peripheral surface of the rear end portion of the pressurizing cylindrical portion 12c1. The flange portion 12c2 is disposed in an inner peripheral surface of a large diameter portion 12a6 of the cylinder body 12a to liquid-tightly slide within the inner peripheral surface thereof. The projecting portion 12c3 is formed such that a diameter thereof is formed smaller than the diameter of the pressurizing cylindrical portion 12c1 and is a columnar portion protruding rearward from the rear end face of the pressurizing cylindrical portion 12c1. The projecting portion 12c3 is arranged to be liquid-tightly slide through the through-hole 12a3 of the partition wall portion 12a2. The rear end portion of the projecting portion 12c3 projects inside of the inner space of the cylinder body 12a, passing through the through-hole 12a3 and is separated from the inner peripheral surface of the cylinder body 12a. The rear end surface of the projecting portion 12c3 is separated from the bottom surface of the input piston 12b and is formed such that the separated distance thereof is variable.

The second master piston 12d is arranged in the cylinder body 12a at the front side of the first master piston 12c. The second master piston 12d is formed in a substantially bottomed cylindrical shape having an opening at the front side. A coil spring 12d1 which is a biasing member is disposed in an inner space of the second master piston 12d between the second master piston 12d and the inner bottom surface of the cylinder body 12a. The second master piston 12$d$ is biased in a rearward direction by the coil spring 12$d$1. In other words, the second master piston 12$d$ is biased towards the initial position by the coil spring 12$d$1.

A first master chamber R1, a second master chamber R2, a first hydraulic pressure chamber R3, a second hydraulic pressure chamber R4 and a servo chamber (corresponding to the "hydraulic pressure chamber") R5 are formed in the master cylinder 12.

The first master chamber R1 is defined (formed) by the inner peripheral surface of the cylinder body 12$a$, the first master piston 12$c$ (front side of the pressurizing cylindrical portion 12$c$1) and the second master piston 12$d$. The first master chamber R1 is connected to the reservoir 14 via a conduit 21 which is connected to the port PT4. Further, the first master chamber R1 is connected to a conduit 40$a$ (actuator 16) via a conduit 22 which is connected to the port PT5.

The second master chamber R2 is defined (formed) by the inner peripheral surface of the cylinder body 12$a$ and the front side of the second master piston 12$d$. The second master chamber R2 is connected to the reservoir 14 via a conduit 23 which is connected to the port PT6. Further, the second master chamber R2 is connected to a conduit 50$a$ (actuator 16) via a conduit 24 which is connected to the port PT7.

The third master chamber R3 is formed between the partition wall portion 12$a$2 and the input piston 12$b$ and is defined (formed) by the inner peripheral surface of the cylinder body 12$a$, the partition wall portion 12$a$2, the projecting portion 12$c$3 of the first master piston 12$c$ and the input piston 12$b$. The second hydraulic pressure chamber R4 is formed at the side of the pressurizing cylindrical portion 12$c$1 of the first master piston 12$c$ and is defined by the inner peripheral surface of the large diameter portion 12$a$6 of the cylinder bore 12$a$1, the pressurizing cylindrical portion 12$c$1 and the flange portion 12$c$2. The first hydraulic pressure chamber R3 is connected to the second hydraulic pressure chamber R4 via a conduit 25 which is connected to the port PT1 and the port PT3.

The servo chamber R5 is formed between the partition wall portion 12$a$2 and the pressurizing cylindrical portion 12$c$1 of the first master piston 12$c$ and is defined (formed) by the inner peripheral surface of the cylinder body 12$a$, the partition wall portion 12$a$2, the projecting portion 12$c$3 of the first master piston 12$c$ and the pressurizing cylindrical portion 12$c$1. The servo chamber R5 is connected to the output chamber R12 via a conduit 26 which is connected to the port PT2.

The pressure sensor 26$a$ is a sensor which detects the servo pressure supplied to the servo chamber R5 and is connected to the conduit 26. The pressure sensor 26$a$ sends the detection signal to the brake ECU 17. The servo pressure detected at the pressure sensor 26$a$ is the actual value of the hydraulic pressure in the servo chamber R5 and is referred to as an actual servo pressure (corresponding to the actual hydraulic pressure).

The stroke simulator portion 13 includes the cylinder body 12$a$, the input piston 12$b$, the first hydraulic pressure chamber R3 and the stroke simulator 13$a$ which is connected to the first hydraulic pressure chamber R3.

The first hydraulic pressure chamber R3 is connected to the stroke simulator 13$a$ via the conduits 25 and 27 which are connected to the port PT1. It is noted that the first hydraulic pressure chamber R3 is connected to the reservoir 14 via a hydraulic passage (not shown), when the input piston 12$b$ is at the initial position.

The stroke simulator 13$a$ generates a reaction force of a magnitude corresponding to the operation state of the brake pedal 11 on the brake pedal 11. The stroke simulator 13$a$ includes a cylindrical portion 13$a$1, a piston portion 13$a$2, a reaction force hydraulic pressure chamber 13$a$3 and a spring 13$a$4. The piston portion 13$a$2 liquid-tightly slidably moves in the cylindrical portion 13$a$1 in response to the braking operation by the brake pedal 11. The reaction force hydraulic pressure chamber 13$a$3 is formed so as to be partitioned between the cylindrical portion 13$a$1 and the piston portion 13$a$2. The reaction force hydraulic pressure chamber 13$a$3 is connected to the first and the second hydraulic pressure chambers R3 and R4 via the conduits 27 and 25. The spring 13$a$4 biases the piston portion 13$a$2 in a direction where the volume of the reaction force hydraulic pressure chamber 13$a$3 decreases.

It is noted that the conduit 25 is provided with a first control valve 25$a$ which is a normally closed type electromagnetic valve. A second control valve 28$a$ which is a normally open type electromagnetic valve is provided in the conduit 28 which connects the conduit 25 and the reservoir 14. When the first control valve 25$a$ is in a closed state, the communication between the first and the second hydraulic pressure chambers R3 and R4 is interrupted. Under such state, the input piston 12$b$ and the first master piston 12$c$ are moved with a predetermined distance held therebetween. Further, when the first control valve 25$a$ is in an open state, the communication between the first and the second hydraulic pressure chambers R3 and R4 is established. Each diameter relationship of the first master piston 12$c$ is configured so that the volumetric change of the first hydraulic pressure chamber R3 and the second hydraulic pressure chamber R4 due to the advance and retreat of the first master piston 12$c$ is absorbed by the movement of the brake fluid.

The pressure sensor 25$b$ is a sensor which detects the reaction force hydraulic pressure in the second hydraulic pressure chamber R4 and the first hydraulic pressure chamber R3 and is connected to the conduit 25. The pressure sensor 25$b$ is also an operation force sensor which detects the operation force applied to the brake pedal 11 and has a correlation with the operation amount of the brake pedal 11. The pressure sensor 25$b$ detects the pressure in the second hydraulic pressure chamber R4 when the first control valve 25$a$ is in the closed state and detects also the pressure (or the reaction force hydraulic pressure) of the connected first hydraulic pressure chamber R3 when the first control valve 25$a$ is in the open state. The pressure sensor 25$b$ sends the detection signal (detection result) to the brake ECU 17.

The booster mechanism 15 generates the servo pressure in response to the operating amount of the brake pedal 11. The booster mechanism 15 forms the hydraulic pressure generating device which outputs the output pressure (servo pressure according to the embodiment) by the operation of the input pressure (pilot pressure according to the embodiment) wherein the reaction delay of the output pressure relative to the input pressure at the starting time of pressure increasing operation or pressure decreasing operation occurs when the output pressure is intended to increase or decrease. The booster mechanism 15 includes a regulator 15$a$ and the pressure supply device 15$b$.

The regulator 15$a$ mainly includes the cylinder body 15$a$1 (corresponding to the sleeve portion), a spool 15$a$2 (corresponding to the piston) which slidably moves within the cylinder body 15$a$1 and a spring 15$a$3 (corresponding to the basing portion). A pilot chamber R11, the output chamber R12 and a third hydraulic pressure chamber R13 are formed in the regulator 15$a$. The regulator 15$a$ includes a spool valve mechanism 15$z$ which is formed by the cylinder body 15$a$1 and the spool 15$a$2.

The pilot chamber R11 is defined (formed) by the cylinder body 15a1 and the front end surface of the second large diameter portion 15a2b of the spool 15a2. The pilot chamber R11 is connected to the pressure decreasing valve 15b6 and the pressure increasing valve 15b7 (connected to the conduit 31) which are connected to the port PT11. The pilot chamber R11 is a chamber in which the pilot pressure corresponding to the actual servo pressure (detected value of the pressure sensor 26a) is generated in response to the movement of the spool 15a2. A restriction projecting portion 15a4 is provided at an inner peripheral surface of the cylinder body 15a1 and positions the spool 15a2 by contacting with the front end surface of the second large diameter portion 15a2b of the spool 15a2. The state that the spool 15a2 is in contact with the restriction projecting portion 15a4 indicates the initial state of the regulator 15a and the state that the spool 15a2 positions at the initial position.

The output chamber R12 is defined (formed) by the cylinder body 15a1, a small diameter portion 15a2c of the spool 15a2, a rear end surface of the second large diameter portion 15a2b and the front end surface of the first large diameter portion 15a2a. The output chamber R12 is connected to the servo chamber R5 of the master cylinder 12 via the conduit 26 which is connected to the port PT12 and the port PT2. Further, the output chamber R12 can be connectable with the accumulator 15b2 via the conduit 32 which is connected to the port PT 13.

The third hydraulic pressure chamber R13 is defined (formed) by the cylinder body 15a1 and the rear end surface of the first large diameter portion 15a2a of the spool 15a2. The third hydraulic pressure chamber R13 is connected with the reservoir 15b1 via the conduit 33 which is connected to the port PT 14. Further, a spring 15a3 is disposed in the third hydraulic pressure chamber R13 which biases the third hydraulic pressure chamber R13 in a direction, where the third hydraulic pressure chamber R13 is enlarged.

The spool 15a2 includes the first large diameter portion 15a2a, the second large diameter portion 15a2b and the small diameter portion 15a2c. The first and the second large diameter portions 15a2a and 15a2b are formed such that they liquid-tightly slide within the cylinder body 15a1. The small diameter portion 15a2c is disposed between the first and the second large diameter portions 15a2a and 15a2b and are formed integrally therewith. The diameter of the small diameter portion 15a2c is formed to be smaller than the diameters of the first and the second large diameter portions 15a2a and 15a2b.

A communication passage 15a5 is provided art the spool 15a2 to connect the output chamber R12 and the third hydraulic pressure chamber R13 in fluid communication.

The pressure supply device 15b also serves as a driving portion which drives the spool 15a2. The pressure supply device 15b includes a reservoir 15b1 which serves as a low pressure source, an accumulator 15b2 which accumulates the brake fluid (corresponding to "fluid") and which serves as a high pressure source, a pump 15b3 which pumps in the brake fluid from the reservoir 15b1 and pumps out to the accumulator 15b2 and an electric motor 15b4 which drives the pump 15b3. The reservoir 15b1 is exposed to the atmosphere and the hydraulic pressure in the reservoir 15b1 is the same level to the atmospheric pressure. The low pressure source is at a lower pressure than the high pressure source. The pressure supply device 15b includes the pressure sensor 15b5 which detects the pressure of the brake fluid supplied from the accumulator 15b2 and outputs the detection result to the brake ECU 17.

Further, the pressure supply device 15b includes the pressure decreasing valve 15b6 and the pressure increasing valve 15b7. The pressure decreasing valve 15b6 is a normally open type structure electromagnetic valve which opens under the non-energized state. The flow-rate of the pressure decreasing valve 15b6 is controlled by the instructions (control current) from the brake ECU 17. One end of the pressure decreasing valve 15b6 is connected to the pilot chamber R11 via the conduit 31 and the other end thereof is connected the reservoir 15b1 via the conduits 34. The pressure increasing valve 15b7 is a normally closed type structure electromagnetic valve which closes under the non-energized state. The flow-rate of the pressure increasing valve 15b7 is controlled by the instructions (control current) from the brake ECU 17. One end of the pressure increasing valve 15b7 is connected to the pilot chamber R11 via the conduit 31 and the other end thereof is connected the accumulator 15b2 via the conduit 35 and the conduit 32 which is connected to the conduit 35. The pressure decreasing calve 15b6 and the pressure increasing valve 15b7 are the proportional electromagnetic valve (linear valve) in which the flow-rate becomes large when the control current becomes large. The regulator 15a, the pressure decreasing valve 15b6 and the pressure increasing valve 15b7 form the "valve portion" which adjusts the flow-rate (fluid amount flowing into or out of) of the brake fluid relative to the servo chamber R5.

In other words, the valve portion includes the regulator 15a which includes the spool 15a2 (piston) driven by the force corresponding to the pilot pressure which is the hydraulic pressure of the pilot chamber and the spring 15a3 (biasing portion) which biases the spool 15a2 in a direction opposite to the direction where the spool 15a2 is driven by the force corresponding to the pilot pressure whereby the flow-rate of the fluid relative to the servo chamber R5 (hydraulic pressure chamber) is adjusted by the movement of the spool 15a2. The valve portion further includes the pressure increasing valve 15b7 disposed between the accumulator 15b2 (high pressure source) and the pilot chamber R11 and the pressure decreasing valve 15b6 disposed between the reservoir 15b1 (low pressure source) and the pilot chamber R11. The brake ECU 17 outputs the control current to the pressure increasing valve 15b7 and the pressure decreasing valve 15b6. The initial state of the regulator 15a corresponds to the state that the spool 15a2 is positioned biased by the spring 15a3 to the predetermined initial position.

The operation of the regulator 15a will be briefly explained hereinafter. When the pilot pressure (hydraulic pressure in the pilot chamber R11) is not supplied to the pilot chamber R11 from any of the pressure decreasing valve 15b6 and the pressure increasing valve 15b7, the spool 15a2 is biased to hold the initial position by the biasing force of the spring 15a3 (See FIG. 1). The initial position of the spool 15a2 is the position where the front-end surface of the spool 15a2 is in contact with the restriction projecting portion 15a4 and is fixed to the position. This position is a position immediately before the rear end surface of the spool 15a2 closes the port PT14.

Thus, when the spool 15a2 is positioned at the initial position, the port PT14 and the port PT12 are in communication with each other through the communication passage 15a5 and at the same time the port PT13 is closed by the spool 15a2 (initial state).

When the pilot pressure which is established in response to the operating amount of the brake pedal 11 is increased by the pressure decreasing valve 15b6 and the pressure increasing valve 15b7, the spool 15a2 slidably moves rearward (right side as viewed in FIG. 1) by overcoming the biasing force of the spring 15a3 and then moves to a position where the port PT 13 closed by the spool 15 a 2 is opened. The port PT14 which has been open, now closes by the spool 152a2. This state is defined as a pressure increasing state. Under such state, the rear end surface of the second large diameter portion 15a2b of the spool 15a2 receives a force which corresponds to the servo pressure (Pressure increasing operation).

Further, the pressurizing force of the front end surface of the second large diameter portion 15a2b of the spool 15a2 balances with the total force of the force corresponding to the servo pressure and the biasing force of the spring 15a3 to define the position of the spool 15a2. This state is defined as a holding state. The port PT13 and the port PT14 are closed by the spool 15a2 in the holding state (Pressure holding operation).

Further, when the pilot pressure which is established in response to the operating amount of the brake pedal 11 is decreased by the pressure decreasing valve 15b6 and the pressure increasing valve 15b7, the spool 15a2 positioned at the holding state slidably moves frontward by overcoming the total force of the force corresponding to the servo pressure and the biasing force of the spring 15a3 and then the port PT13 which has been in closed state holds the closed state and the port PT14 which has been in closed state opens. Under this state, the port PT14 and the port PT12 are in fluid communication through the communication passage 15a5. (Pressure decreasing operation).

The booster mechanism 15 as explained above establishes the pilot pressure in response to the stroke of the brake pedal 11 by the operation of the pressure decreasing valve 15b6 and the pressure increasing valve 15b7 and the servo pressure in response to the stroke of the brake pedal 11 is generated by the pilot pressure. Thus, generated servo pressure is supplied to the servo chamber R5 of the master cylinder 12 and then the master cylinder 12 supplies the wheel cylinder WC with the master cylinder pressure generated in response to the stroke of the brake pedal 11. The pressure decreasing valve 15b6 and the pressure increasing valve 15b7 form the valve portion which adjusts the flow of brake fluid (flow-rate) relative to the servo chamber R5.

Further explanation will be made for operation of the regulator 15a with reference to FIGS. 2A and 2B. In FIG. 2A, from the top to the bottom, the initial position (initial state), pressure decreasing starting position (pressure increasing switching position) and the pressure increasing state of the spool 15a2 are shown. In other words, the state of the spool 15a2 starting movement from the initial position until it reaches to the pressure increasing state is shown. In FIG. 2B, from the top to the bottom, the initial position, pressure decreasing state, pressure decreasing starting position (pressure decreasing switching position), holding state and the pressure increasing starting position of the spool 15a2 are shown. The pressure decreasing starting position in FIG. 2B is a position immediately before the state changes from the holding state to the pressure decreasing state.

As shown in FIG. 2A, the initial position is the position where the spool 15a2 moves by the biasing force of the spring 15a3 until the front-end surface of the spool 15a2 is brought into contact with the restriction projecting portion 15a4 to be fixed to the position. It is noted that the initial position according to the embodiment is the position that the rear end surface of the spool 15a2 overlaps the front side of the periphery of the port PT14.

Under the pressure increasing starting position, the spool 15a2 closes the port PT14 and the position immediately before the port PT13 which has been in the closed state starts opening. At the pressure increasing starting position, the output chamber R12 is in a disconnected state with t the reservoir 15b1 through the port PT14 and at the same time the fluid communication with the output chamber R12 and the accumulator 15b2 starts via the port PT13. The spool 15a2 at this position has moved by a distance L2 from the initial position towards the rearward (right side). This area from the initial position to the pressure increasing starting position is defined to be the "idle area Z1". In other words, when the pressure increasing control is executed from the initial position, the regulator 15a has the idle area Z1 in which the pressure increasing control does not have influence on the actual servo pressure (detected value of the pressure sensor 26a).

Under the pressure increasing state, the spool 15a2 keeps the port PT14 to be closed and opens the port PT13 and the output chamber R12 is in a connected state with the accumulator 15b2 via the port PT13. The pressure increasing state of the spool 15a2 in FIG. 2A is moved from the initial position by a distance L3 towards rearward (right side).

As shown in FIG. 2B, under the pressure decreasing state, the spool 15a2 closes the port PT13 and opens the port PT14 and the output chamber R12 is in a connected state with the reservoir 15b1 via the port PT14. The pressure decreasing state of spool 15a2 in FIG. 2B has moved toward the rearward (right side) by the distance L0 from the initial position.

In the holding state, the spool 15a2 positions where the port PT13 and the port PT14 are closed thereby. The output chamber R12 is interrupted from the communication with both the reservoir 15b1 and the accumulator 15b2. The holding state of the pool 15a2 has moved toward the rearward (right side) by the distance L1.5 from the initial position.

Under the pressure decreasing starting position, the spool 15a2 keeps closing of the port PT13 and the port PT14 which has been in the closed state is now in a position immediately before the staring of opening the port PT14. Under the pressure decreasing starting position, the output chamber R12 is in a disconnected state with the accumulator 15b2 via the port PT13 and the fluid communication with the output chamber R12 and the reservoir 15b1 starts via the port PT14. The spool 15a2 of this position has moved by a distance L1 from the initial position towards the rearward (right side). In other words, the holding state means the spool relative position between the position of L1 to the position of L2 and this area is defined to be a "lap area Z2".

Further, when switching from hold control to pressure increasing control, the regulator 15a is shifted to the pressure increasing state after the spool 15a2 under the holding state slidably moves by a pressure increasing side lap area (pressure increasing lap distance Lu1). Further, when switching from holding control to pressure decreasing control, the regulator 15a is shifted to the pressure decreasing state after the spool 15a2 under the holding state slidably moves by a pressure decreasing side lap area (pressure decreasing lap distance Ld1). Thus, the regulator 15a has an lap area Z2 (the pressure increasing side lap area and the pressure decreasing side lap area) in which the pressure increasing control or the pressure decreasing control does not reflect when the control is switched over from the holding control to the pressure increasing or decreasing control. It is noted that the term "does not have influence on" or "does not reflect" includes a slight reflection or a slight response which is smaller than expected.

The actuator 16 is a device which adjusts the brake hydraulic pressure applied to each wheel cylinder WC and is provided with the first and the second conduit systems 40 and 50. The first conduit system 40 controls the brake hydraulic pressure applied to the rear-left wheel Wrl and the rear-right wheel Wrr, whereas the second conduit system 50 controls the brake hydraulic pressure applied to the front-right wheel Wfr and the front-left wheel Wfl. In other words, the front/rear conduit system is adopted as the conduit structure.

The hydraulic pressure supplied from the master cylinder 12 is transmitted to each wheel cylinder WC (WCrl, WCrr, WCfr and WCfl) through the first and the second conduit systems 40 and 50. The first conduit system 40 is provided with a hydraulic passage 40a which connects the wheel cylinders WCrl and WCrr and the hydraulic passage 22. The second conduit system 50 is provided with a hydraulic passage 50a which connects the wheel cylinders WCfr and WCfl and the hydraulic passage 24. The hydraulic pressure supplied from the master cylinder 12 is transmitted to each wheel cylinders WCrl, WCrr, WCfr and WCfl through these hydraulic passages 40a and 40b, respectively.

The hydraulic passages 40a and 50a are branched off to respective two hydraulic passages 40a1 and 40a2 and 50a1 and 50a2, respectively. Each hydraulic passage 40a1 and 50a1 is provided with each first pressure increasing valve 41 and 51 which controls the pressure increase of the brake hydraulic pressure to each wheel cylinder WCrl and WCfr. Another each hydraulic passage 40a2 and 50a2 is provided with the second pressure increasing valve 42 and 52 which controls the pressure increase of the brake hydraulic pressure to each wheel cylinder WCrr and WCfl.

These first and the second pressure increasing valves 41, 42, 51 and 52 are formed by a two-positional electromagnetic valve which can control connection/disconnection state of the valve. The first and the second pressure increasing valves 41, 42, 51 and 52 are formed as a normally open type valve which becomes connected state when the control current to the solenoid coil provided in the respective valves 41, 42, 51 and 52 becomes zero (non-energized state) and becomes disconnected state when the control current flows through the solenoid coil (energized state).

The hydraulic passages between the first and the second pressure increasing valves 41, 42, 51 and 52 in the hydraulic passages 40a and 50a and the wheel cylinders WCrl, WCrr, WCfr and WCfl are connected to the reservoirs 43 and 53, respectively through the hydraulic passages 40b and 50b as the pressure decreasing hydraulic passage. In the hydraulic passages 40b and 50b, the first and the second pressure decreasing valves 44, 45, 54 and 55 are respectively provided which are formed by a two-positional electromagnetic valve which can control connection/disconnection state of the valve. The first and the second pressure decreasing valves 44, 45, 54 and 55 are formed as a normally closed type valve which becomes disconnected state when the control current to the solenoid coil provided in the respective valves 44, 45, 54 and 55 becomes zero (non-energized state) and becomes connected state when the control current flows through the solenoid coil (energized state).

The hydraulic passages 40c and 50c which serve as the return hydraulic passages are provided between the reservoirs 43 and 53 and the hydraulic passages 40a and 50a which are the main hydraulic passages. Pumps 46 and 56 which are driven by the motor 47 are provided in the hydraulic passages 40c and 50c for sucking from the reservoirs 43 and 53 and for discharging the brake fluid towards the master cylinder 12 side or the wheel cylinder WCrl, WCrr, WCfr and WCfl side.

The pumps 46 and 56 suck the brake fluid from the reservoirs 43 and 53. The brake ECU 17 calculates the wheel speed of each wheel, a presumed vehicle speed and a slip ratio based on the detection signal from the wheel speed sensor S. The brake ECU 17 performs the anti-skid control or the like based on the calculation result. Various information from various sensors is inputted to the brake ECU 17.

Each control using the actuator 16 is executed at the brake ECU 17. For example, by outputting the control current which controls various type control valves 41, 42, 44, 45, 51, 52, 54 and 55 and the motor 47 which drives the pumps, the brake ECU 17 controls the hydraulic pressure circuit equipped in the actuator 16 to individually control the wheel cylinder pressures transmitted to the respective wheel cylinders WC. For example, the brake ECU 17 executes the anti-skid control which prevents wheels from locking by executing pressure decreasing, pressure holding and pressure increasing of the wheel cylinder pressure when a wheel slips upon braking operation or executes a stability control which allows to perform an ideal turning operation of the vehicle by suppressing the skidding tendency (under-steer or over steer tendency) by automatically increasing the wheel cylinder pressure of the control subject wheel. The actuator 16 is the ABS (Anti-lock brake system) in one meaning.

(Correction of Control Current)

The brake ECU 17 includes a control portion 171, a judging portion 172, and a correcting portion 173. The control portion 171 sets the target servo pressure which is the target value of the hydraulic pressure in the servo chamber R5 and outputs the control current corresponding to the flow-rate to the pressure decreasing valve 15b6 and/or the pressure increasing valve 15b7 to have the actual servo pressure which is the actual value of the hydraulic pressure in the servo chamber R5 approximate the target servo pressure. The control portion 171 executes the pressure increasing control which increases the actual servo pressure, the pressure decreasing control which decreases the actual servo pressure or the holding control which holds the actual servo pressure. Explaining simply, the pressure increasing control controls the pressure decreasing valve 15b6 to close and the pressure increasing valve 15b7 to open, the pressure decreasing control controls the pressure decreasing valve 15b6 to open and the pressure increasing valve 15b7 to close and the holding control controls both pressure increasing valve 15b7 and pressure decreasing valve 15b6 to close. The magnitude of the control current corresponds to the magnitude of the flow-rate of the fluid at the electromagnetic valve (pressure increasing valve 15b7 and pressure decreasing valve 15b6).

Figure 3:
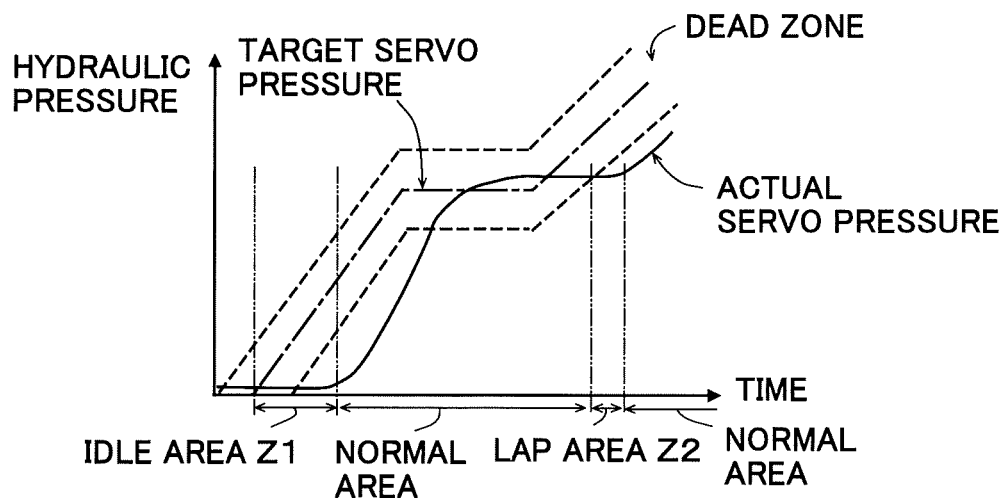
FIG. 3 is an explanatory diagram explaining classified areas according to the embodiment.

The judging portion 172 judges whether or not the pressure increasing control is executed in the idle area Z1 when the pressure increasing control is executed by the control portion 171. Further, the judging portion 172 judges whether or not the pressure increasing control or the pressure decreasing control is executed in the lap area Z2 when the pressure increasing control or the pressure decreasing control is executed by the control portion 171. The area which is neither the idle area Z1 nor the lap area Z2 is defined to be the normal area. In other words, the judging portion 172 judges which of the current control is either one of the idle area Z1, lap area Z2 and other normal area (other than the idle area Z1 and lap area Z2). As shown in FIG. 3, based on the control state and the actual servo pressure, the idle area Z1, the lap area Z2 and the normal area are judged. The control portion 171 executes the holding control when the actual servo pressure is within the dead zone set relative to the target servo pressure.

The judging portion 172 of the embodiment receives the information on control (no hydraulic pressure control, pressure increasing control, pressure decreasing control and holding control) from the control portion 171 and executes various judgements based on the information on the control. The judging portion 172 judges that the pressure increasing control is executed in the idle area Z1, when the pressure increasing control is executed from the state that no hydraulic pressure control is executed (state that the braking operation is not executed: initial state). Further, the judging portion 172 judges that the pressure increasing control or the pressure decreasing control is executed in the lap area Z2, when the holding control is switched over to the pressure increasing control or the pressure decreasing control. The judging portion judges that the control is executed in the normal area when the control other than above is executed, i.e., when the control is executed neither in the idle area Z1 nor in the lap area Z2. The judging portion sends the judgement result to the correcting portion 173.

The correcting portion 173 corrects the control current towards the side where the flow-rate is increasing when the reaction time of the actual servo pressure relative to the pressure increasing control or the pressure decreasing control exceeds the predetermined threshold time. In this situation, the correcting portion 173 corrects the control current to be increased. In the correcting portion 173, three different threshold times, i.e., idle threshold time, lap threshold time and normal threshold time which values are different form one another are set as the threshold time. The correcting portion 173 adopts the idle threshold time as the threshold time when the pressure increasing control is judged to be executed in the idle area Z1 by the judging portion 172. When the reaction time of the actual servo pressure in the idle area Z1 exceeds the idle threshold time, the correcting portion 173 executes the correction. It is noted here that the "reaction time of the actual servo pressure in the idle area Z1" is defined to be the time period from the time when the pressure increasing control is executed until the time when the actual servo pressure (or the increasing width of the actual servo pressure) exceeds the first predetermined value.

Further, the "in a case that the reaction time of the actual servo pressure in the idle area Z1 exceeds the idle threshold time" means the case that "the actual servo pressure is not reached to the first predetermined value at the time when the idle threshold time has passed since the start of the execution of the pressure increasing control". Explaining differently, when the brake ECU 17 (for example, the valve opening judging portion which is not shown in the drawing) judges that the pressure increasing valve 15b7 opened by the time the idle threshold time elapses from the start of control, the correcting portion 173 does not execute the correction and when the brake ECU 17 does not judge that the pressure increasing valve 15b7 opened at the time the idle threshold time elapses from the start of control, the correcting portion 173 executes the correction.

Further, the correcting portion 173 adopts the lap threshold time as the threshold time when the pressure increasing control or the pressure decreasing control is judged to be executed in the lap area Z2 by the judging portion 172. When the reaction time of the actual servo pressure in the lap area Z2 exceeds the lap threshold time, the correcting portion 173 executes the correction. It is noted here that the "reaction time of the actual servo pressure in the lap area Z2" is defined to be the time period from the time when the holding control is switched over to the pressure increasing control or the pressure decreasing control pressure increasing control until the time when the change width of the actual servo pressure (change value of the actual servo pressure from an approximately constant value) exceeds the second predetermined value towards the pressure increasing side when the pressure increasing control is executed and towards the pressure decreasing side when the pressure decreasing control is executed. Further, it is noted here that the case that "the reaction time of the actual servo pressure in the lap area Z2 exceeds the lap threshold time" means the case when "the change width of the actual servo does not exceed the second predetermined value at the time when the lap threshold time elapsed from the switching over of the control (or the case when pressure increasing valve 15b7 or the pressure decreasing valve 15b6 is not judged to be open).

Further, the correcting portion 173 adopts the normal threshold time as the threshold time when the pressure increasing control or the pressure decreasing control is judged to be executed in the normal area by the judging portion 172. Then, the correcting portion 173 executes the correction when the reaction time of the actual servo pressure in the normal area exceeds the normal threshold time. It is noted here for example, that the "reaction time of the actual servo pressure in the normal area immediately after the idle area Z1" is defined to be the time period from the time when the actual servo pressure exceeds the first predetermined value until the time when the change width of the actual servo pressure exceed the third predetermined value set corresponding to the target pressure increasing inclination (inclination of the target servo pressure). Further, it is also noted here that "the reaction time of the actual servo pressure in the normal area exceeds the normal threshold time" means that the case where the change of width of the actual servo pressure does not exceed the third predetermined value at the time when the normal threshold time passed after the actual servo pressure exceeded the first predetermined value. The correcting amount when the correction was executed in the idle area Z1, i.e., the increased current amount is not used in the normal area and is re-set.

Thereafter, the correcting portion 173 executes the correction, when the change of width of the actual servo pressure (difference from the third predetermined value) does not exceed the third predetermined value (when the target pressure increasing inclination is changed, another predetermined value) at the time when the normal threshold time elapsed from the time when the change of width of the actual servo pressure exceeded the third predetermined value, when the control is judged to be in the normal area. As explained, the correction in the normal area is executed based on the normal threshold time and the third predetermined value or the like.

The correcting portion 173 executes the correction so that the control current increases as more the time passes, when the correction is executed. The correcting portion 173 according to the embodiment, increases the control current linearly relative to the elapsing time. It is noted here that the correcting portion 173 may increase the control current stepwise relative to the elapsing time.

The correcting portion 173 memorizes and renews the corrected amount corrected in the lap area Z2 and the normal area and, in one braking operation (operation from the start of braking operation to the complete releasing operation thereof), such corrected amount is applied in the following lap area Z2 and the normal area. In other words, in one braking operation, the corrected amount in the lap area Z2 is applied in the normal area and the corrected amount in the normal area is applied in the normal area and the lap area Z2, but the corrected amount in the idle area Z1 is not applied in the lap area Z2 and the normal area.

For example, when the area is changed from the normal area to the lap area Z2, the corrected amount in the normal area (corrected amount of the latest) is also applied consecutively in the lap area Z2 and the control current which is the value of the scheduled control current added by the corrected amount (corrected control current) is outputted. This is the same with the case that the area is changed from the lap area Z2 to the normal area. The correcting portion 173 does not apply the corrected amount in the idle area Z1 at the control in the normal area and resets the correction amount. Once the one braking operation is completed, the correcting portion 173 resets all of the corrected amounts and does not reflect the correction to the next braking operation. Since normally, correction is not necessary during the holding control, no correction is executed in this control. The one braking operation means one cycle braking operation from the time the braking force is increasing from the value zero and is returning to the value zero and a series of operation by the driver of the vehicle from the start of operating the brake operating member until releasing thereof.

Figure 4:
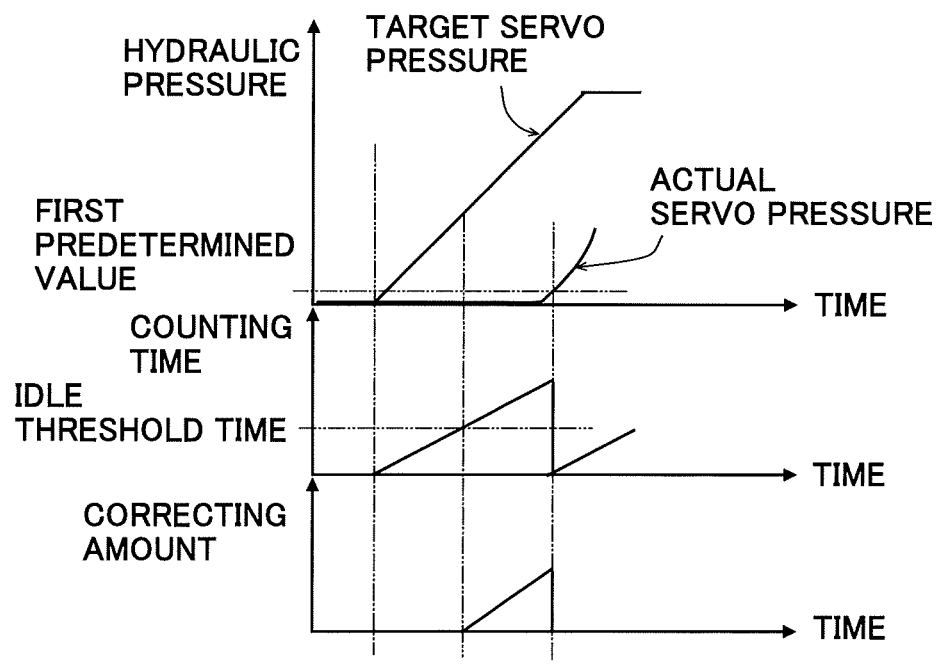
FIG. 4 is a time chart explaining correction in the idle area according to the embodiment.

An example of execution of correction will be explained hereinafter with respect to the control in the idle area Z1. As shown in FIG. 4, the correcting portion 173 starts counting of the reaction time in response to the start of the braking operation (increase in target servo pressure). The correcting portion 173 starts correction when the actual servo pressure does not exceed the first predetermined value when the counting time reached to the idle threshold time. In other words, in this control, the correcting portion 173 increases the corrected amount (current value added to the control current) linearly as the time lapses to gradually increase the control current to the pressure increasing valve 15$b$7. Then, the pressure increasing valve 15$b$7 open and when the actual servo pressure exceeds the first predetermined value, the correcting portion 173 finishes the correction and resets the counting time and the corrected amount and starts counting of reaction time in the normal area. On the other hand, the correcting portion 173 does not execute correction when the actual servo pressure exceeds the first predetermined value before the counting time reaches to the idle threshold time and resets the counting time and starts counting of the reaction time as the control in the normal area.

Figure 5:
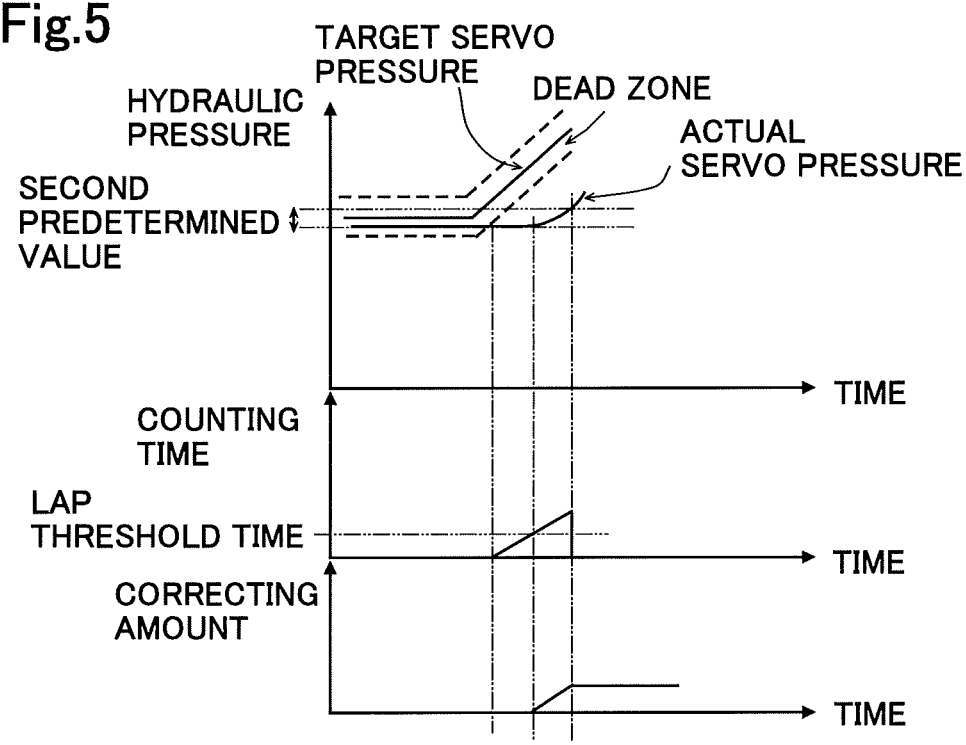
FIG. 5 is a time chart explaining correction in the lapping area according to the embodiment.

Next, an example of correction in the lap area Z2 will be explained. As shown in FIG. 5, the correcting portion 173 starts counting of reaction time in the lap area Z2 when the control is changed from the holding control to the pressure increasing control. The correcting portion 173 starts correction when the width of change of the actual servo pressure does not exceed the second predetermined value when the counting time reached to the lap threshold time. Similarly, the correcting portion 173 increases the correcting amount linearly as the time elapses and gradually increases the control current to the pressure increasing valve 15$b$7. Then, when the width of change of the actual servo pressure exceeds the second predetermined value, the correcting portion 173 stops the increase of the correcting current amount and keeps the correcting amount and then resets the counting time to start the counting of the reaction time in the normal area. In other words, the correcting portion 173 keeps the correcting amount at the time when the width of change of the actual servo pressure exceeded the second predetermined value continuously in the following control. Thus, the correcting amount is added to the control current in the normal area. On the other hand, when the width of change of the actual servo pressure exceeds the second predetermined value before the counting time reaches to the lap threshold time, the correcting portion 173 does not execute correction and resets the counting time and starts the counting of the reaction time in the normal area. As explained, the process of correction in the lap area Z2 is executed as same as the case of process of correction of the control current to the pressure decreasing valve 15$b$6 when switching from holding control to pressure decreasing control, which process is not shown in the drawings.

Figure 6:
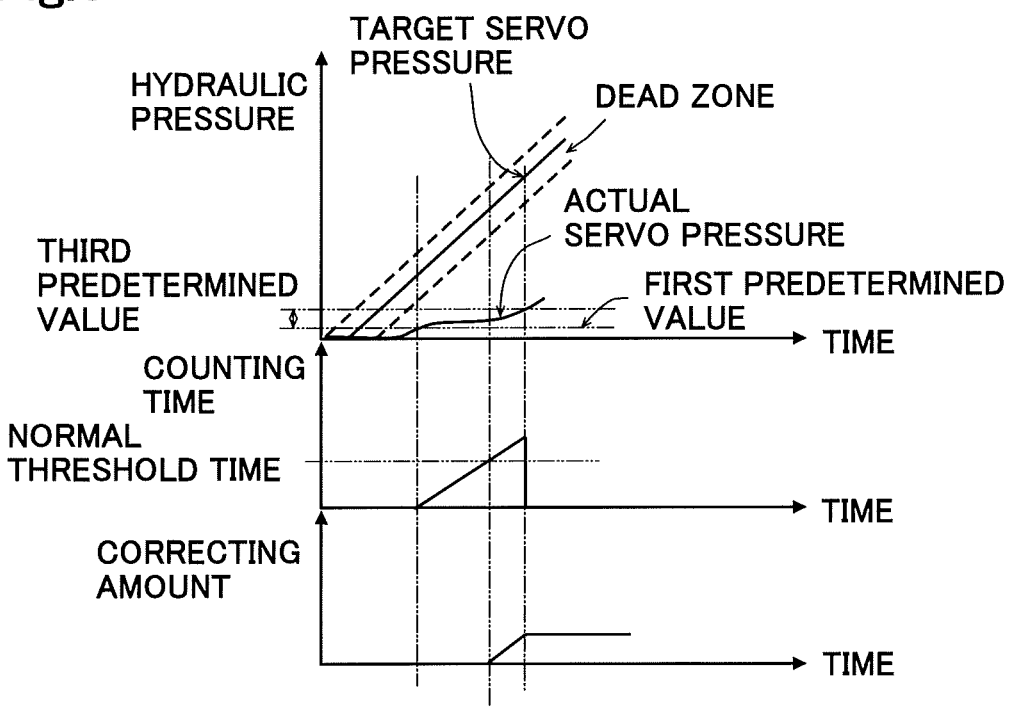
FIG. 6 is a time chart explaining correction in the normal area according to the embodiment.

Further, an example of correction in the normal area upon sifting from the idle area Z1 to the normal area will be explained. As shown in FIG. 6, the correcting portion 173 starts counting of reaction time in the normal area when the actual servo pressure exceeds the first predetermined value (when the judgement that the control is in the idle area Z1 is finished) after the braking operation has started. The correcting portion 173 starts correction when the width of change of the actual servo pressure does not exceed the third predetermined value when the counting time reached to the normal threshold time. Similarly, the correcting portion 173 increases the correcting amount linearly as the time elapses and gradually increases the control current to the pressure increasing valve 15$b$7. Then, when the width of change of the actual servo pressure exceeds the third predetermined value, the correcting portion 173 stops the increase of the correcting current amount and keeps the correcting amount and then resets the counting time.

As explained, the counting of the correction of the control current starts upon starting of braking operation or the shifting of the area and continues until the change of the actual servo pressure equal to or more than the predetermined value is detected, i.e., the opening of the control subject electromagnetic valve (here, the pressure increasing valve 15$b$7) is detected. The correcting portion 173 memorizes the correcting amount at the time when the width of change of the actual servo pressure exceeded the third predetermined value in the correction in the normal area.

On the other hand, when the width of change of the actual servo pressure exceeded the third predetermined value before the counting time reached to the normal threshold time, the correcting portion 173 does not execute correction and resets the counting time.

Further, the correcting portion 173 derives the correction of the control current, in the normal area upon shifting from the lap area Z2 to the normal area, as similar to the case of the normal area upon shifting from the idle area Z1 to the normal area. In other words, the correcting portion 173 starts counting of the reaction time in the normal area when the actual servo pressure exceeded the second predetermined value (when the judgement that the control is in the lap area Z1 is finished), after the control has shifted from the holding control to the pressure increasing control. The correcting portion 173 starts correction, when the width of change of the actual servo pressure does not exceed the predetermined value when the counting time reached to the normal threshold time. For example, the correcting portion 173 derives the correcting amount in response to the elapsed time from the start of the correction.

The process of correction in the normal area is executed as same as the case of process of correction of the control current to the pressure decreasing valve 15$b$6 in the normal area, which process is not shown in the drawings.

The correcting amount in the normal area and in the lap area Z2 continues under the state other than the state that the control is judged to be in the idle area Z1 in one braking operation process. When the reaction delay occurs in the control at the continuing correcting amount upon shifting to the normal area or to the lap area Z2, the additional correcting amount is added linearly to the current correcting amount as similar to the case above and the control by the added correcting amount (renewed correcting amount) continues in one braking operation process. It is noted that when the area is shifted, the control unit 171 may once return the control current to the initial state and then output the control current corresponding to the area.

Figure 7:
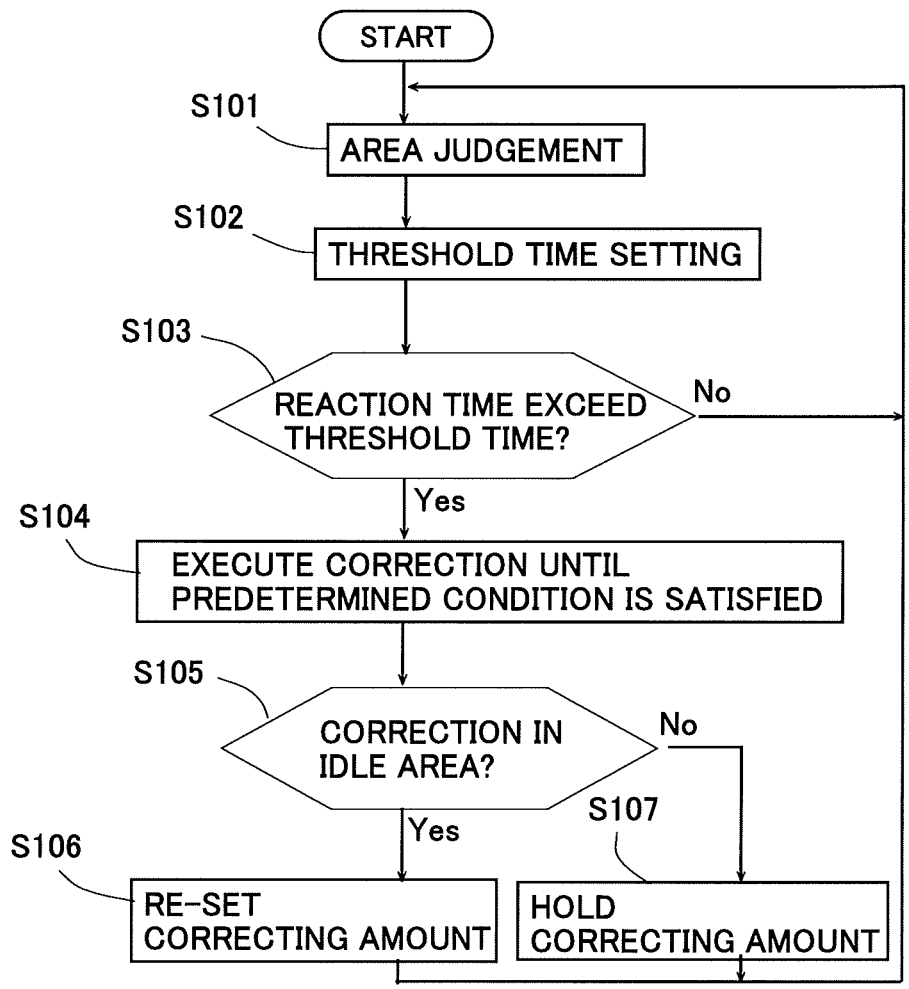
FIG. 7 is a flowchart explaining the correction according to the embodiment.

The flow of correction of control current by the brake ECU 17 will be explained hereinafter briefly. As shown in FIG. 7, the brake ECU 17 judges in which area the current control (control by the control portion 171) is executed. (S101). The brake ECU 17 sets the threshold time in response to the judged area (S102). In detail, the brake ECU 17 sets (adopts) the idle threshold time as the threshold time when the detection result indicates the control in the idle area Z1 and sets the lap threshold time as the threshold time when the detection result indicates the control in the lap area Z2, and further sets the normal threshold time as the threshold time when the control is in the normal area.

Then, the brake ECU 17 monitors actual servo pressure and judges whether or not the reaction time of the actual servo pressure relative to the pressure increasing control or the pressure decreasing control exceeds a threshold time set according to the area (S103). In other words, the brake ECU 17 judges whether or not the predetermined condition (for example, whether the actual servo pressure has exceeded the first predetermined value or not) set in each area is satisfied before the time elapsed from the start of counting reaches to the threshold time. In other words, the brake ECU 17 monitors (judges) whether the electromagnetic valve (pressure decreasing valve 15b6 or the pressure increasing valve 15b7) opens by the set threshold time. In other words, the predetermined condition may be said as a condition for judging that the electromagnetic valve opens (properly).

When the reaction time exceeds the set threshold time (S103: Yes), the brake ECU 17 increases the control current and corrects the control current towards the increasing side of the inflow or outflow of the fluid relative to the servo chamber R5 until the set condition (for example, open valve judging condition) at each area is satisfied. (S104). When the set condition is satisfied, if the control is executed in the idle area Z1, the correcting amount is reset (S106) and if the control is not executed in the idle area Z1 (S105: No), the brake ECU 17 holds the correcting amount (S107).

The length of each threshold time is freely set. For example, since the idle area Z1 and the lap area Z2 include the area in which the actual servo pressure does not react or substantially not reflected (invalid area) to the control, the time for the idle threshold time or the lap time may be set longer than the time for the normal threshold time. (i.e., idle threshold time>lap threshold time>normal threshold time or lap threshold time>idle threshold time>normal threshold time). Further, also, some brake systems perform control (specific control) to shorten the time of ineffective areas such as lap skipping control and idle elimination control (pre-pressure increasing control). In such a brake system, the idle threshold time and/or the lap threshold time may be set smaller than the normal threshold time according to the specific control.

As explained above, the correcting portion 173 increases the corrected correcting amount such that the longer the elapsed time from the time when the reaction time exceeded the threshold time (idle threshold time, lap threshold time or normal threshold time), the larger the correcting amount becomes. Further, the correcting portion 173 discards the correcting amount which has been adopted in the idle area Z1 upon shifting of the control from the idle area Z1 to other areas. Further, the correcting portion 173 continues to hold the correcting amount which has been adopted in the control in the lap area Z2 in the following control in the normal area, upon shifting the control in the lap area Z2 to the control in the normal area which is neither the idle area nor the lap area.

According to this embodiment, the threshold time in the control in the idle area Z1 is set to a value different from the control in the other areas, as an idle threshold time. In other words, according to the embodiment, it is possible to set the threshold time apart from the normal threshold time, considering the area where the actual pressure does not respond (invalid area). Accordingly, it is possible to correct the control current, depending on the situation, i.e., considering the idle area Z1. Further, in more detail, according to the embodiment, different threshold times are set per every judged area (idle area Z1, lap area Z2 and normal area) and accordingly, the correction in response to each area, i.e., in response to the judgement whether the invalid area exists or not or in response to the control method for invalid area can be possible. Thus, according to the embodiment, the difference in reaction time per every area can be considered and considering such difference, it is possible to correct depending on the situation to be able to suppress any surplus correction.

Further, according to the embodiment, except for the correcting amount in the idle area Z1, the corrected correcting amount is adopted continuously during one braking operation process. Therefore, in the area except for the idle area Z1 which is a specific area, the correction is not necessarily made from zero value and more properly, the reaction time can be held within the permissible time. The corrected control current (sum of the control current and the correcting amount) when the predetermined condition is satisfied in the normal area or in the lap area Z2 can be considered to be a value close to the true value of the valve opening current of the pressure decreasing valve 15b6 or the pressure increasing valve 15b7 and by applying this during the one braking operation process, more appropriately the valve opening response (flow-rate control) can be realized. It is noted here that the correcting amount in the lap area Z2 can be continuously used in the normal area, since the flow-rate of the fluid at the electromagnetic valve influences on the actual servo pressure due to the volume change in the servo chamber R5 in the lap area Z2.

Figure 8:
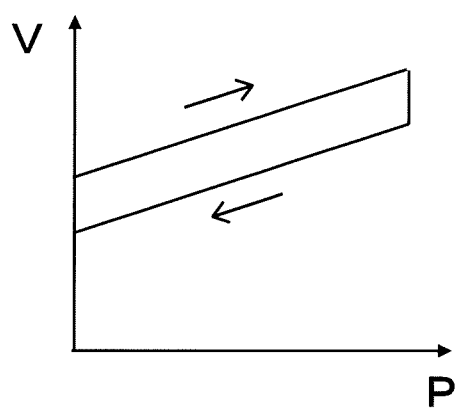
FIG. 8 is an explanatory view explaining PV performance characteristics of the regulator according to the embodiment.
Figure 9:
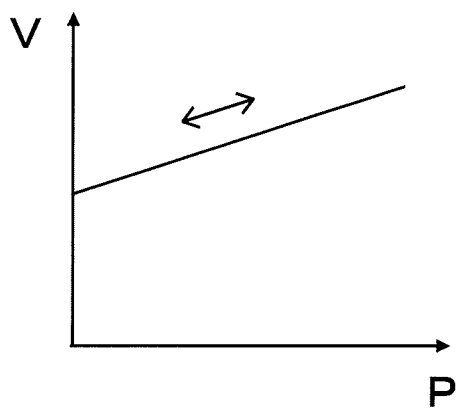
FIG. 9 is an explanatory view explaining one example of PV performance characteristics of another regulator.

Further, according to the embodiment, since the regulator 15a is provided, the necessity and effect of correction of the control current are very high. Particularly, since the regulator 15a is structured to include a spool (spool type piston) 15a2, the idle area Z1 and the lap area Z2 are provided to further heighten the necessity and the effect of correction. For example, as shown in FIG. 8, according to the regulator 15a, the pressure is relatively changeable relative to the change of the volume of the pilot chamber R11 (inflow amount and outflow amount of fluid). Further, as shown in FIG. 9, even if it is a regulator (for example, a poppet type regulator) without the wrap region Z2, the pressure tends to change with a change in volume. In other words, according to the structure as explained, to properly achieve flow-rate control, it is necessary to correct and by adopting the structure of the embodiment, it is possible to correct appropriately (flow-rate control).

(Others)

Figure 10:
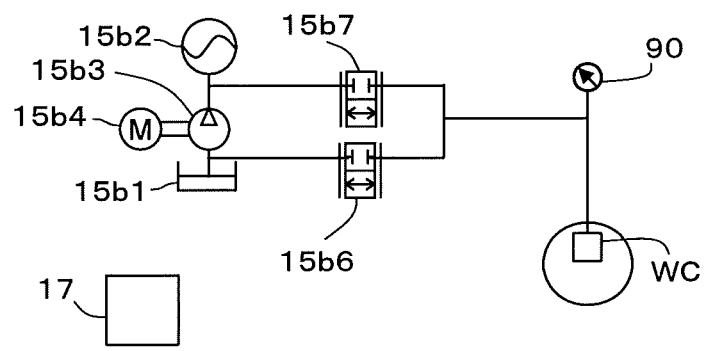
FIG. 10 is a structural view of modified embodiment of the embodiment.
Figure 11:
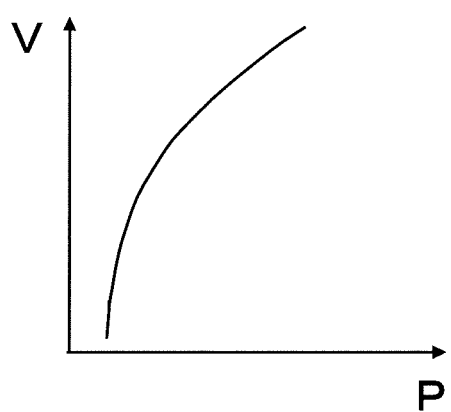
FIG. 11 is an explanatory view explaining one example of PV performance characteristics of the wheel cylinder.

The invention is not limited to the embodiments explained above and for example, the invention can be applicable to the device without regulator. For example, according to the brake system shown in FIG. 10, the hydraulic pressure of the wheel cylinder WC can be the actual pressure (actual wheel pressure) and the actual wheel pressure can be detected by a pressure sensor 90. By controlling the pressure decreasing valve 15b6 and the pressure increasing valve 15b7 (corresponding to the valve portion), the flow-rate of the fluid relative to the wheel cylinder WC can be adjusted. The brake system includes the idle area Z1 in which the actual wheel pressure does not respond to the pressure increasing control (including an extremely small response) until the brake pad is brought into contact with the disc rotor DR. In such structure, by applying the invention, the same effect obtained by the above embodiment can be also obtained. Further, the method for judging the area by the judging portion 172 may be the method for judging the area bin response to the position of the spool 15a2 estimated based on the control hydraulic pressure inclination or the like.

SUMMARY

The hydraulic pressure control device according to the embodiment can be described as follows: The hydraulic pressure control device of the embodiment includes a valve portion 15a, 15b6, 15b7 (or 15b6, 15b7) which adjusts a flow-rate of a fluid relative to a hydraulic pressure chamber R5 (or WC), a control portion 171 which sets a target pressure which is a target value of a hydraulic pressure in the hydraulic pressure chamber R5 and outputs a control current corresponding to the flow-rate to the valve portion 15b6, 15b7 so that an actual pressure which is an actual value of the hydraulic pressure in the hydraulic pressure chamber R5 approximates the target pressure and a correcting portion 173 which corrects the control current toward an increasing side in which the flow-rate increases when a reaction time of the actual pressure relative to a pressure increasing control which controls the actual pressure to increase or a pressure decreasing control which controls the actual pressure to decrease, exceeds a predetermined threshold time, wherein an idle area Z1 is provided in which the actual pressure is not affected by the pressure increasing control when the pressure increasing control is executed from an initial state of the hydraulic pressure chamber R5 or the valve portion 15a, 15b6m 15b7. The hydraulic pressure control device further includes a judging portion 172 which judges whether the pressure increasing control is executed in the idle area Z1 or not, wherein in a case in which the pressure increasing control is judged to be executed in the idle area Z1 by the judging portion 172, as the threshold time, the correcting portion 173 adopts an idle threshold time which is set to be a value different from the threshold time in a case in which the pressure increasing control is not judged to be executed in the idle area by the judging portion 172 and executes a correction of the control current when the reaction time of the actual pressure relative to the pressure increasing control exceeds the idle threshold time.

REFERENCE SIGNS LIST

11; brake pedal, 12; master cylinder, 13; stroke simulator portion, 14; reservoir, 15; booster mechanism, 15a; regulator (valve portion), 15a1; cylinder body (sleeve portion), 15a2; spool (piston), 15a3; spring (biasing portion), 15z; spool valve mechanism, 15b; pressure supply device, 15b1; reservoir (low pressure source), 15b2; accumulator (high pressure source), 15b6; pressure decreasing valve (valve portion), 15b7; pressure increasing valve (valve portion), 16; actuator, 17; brake ECU, 171; control portion, 172; judging portion, 173; correcting portion, A; hydraulic pressure braking force generating portion, B; hydraulic pressure control device, R5; servo chamber (hydraulic pressure chamber), R11; pilot chamber, WC; wheel cylinder, Z1; idle area, Z2; lap area.

The invention claimed is:

1. A hydraulic pressure control device comprising:
   a valve portion which adjusts a flow-rate of a fluid relative to a hydraulic pressure chamber;
   a control portion which sets a target pressure which is a target value of a hydraulic pressure in the hydraulic pressure chamber and outputs a control current corresponding to the flow-rate to the valve portion so that an actual pressure which is an actual value of the hydraulic pressure in the hydraulic pressure chamber approximates the target pressure; and
   a correcting portion which corrects the control current toward an increasing side in which the flow-rate increases when a reaction time of the actual pressure relative to a pressure increasing control which controls the actual pressure to increase or a pressure decreasing control which controls the actual pressure to decrease, exceeds a predetermined threshold time, wherein an idle area is provided in which the actual pressure is not affected by the pressure increasing control when the pressure increasing control is executed from an initial state of the hydraulic pressure chamber or the valve portion, the hydraulic pressure control device further comprising:
   a judging portion which judges whether the pressure increasing control is executed in the idle area or not wherein,
   in a case in which the pressure increasing control is judged to be executed in the idle area by the judging portion, as the threshold time, the correcting portion adopts an idle threshold time which is set to be a value different from the threshold time in a case in which the pressure increasing control is not judged to be executed in the idle area by the judging portion and executes a correction of the control current when the reaction time of the actual pressure relative to the pressure increasing control exceeds the idle threshold time.

2. The hydraulic pressure control device according to claim 1, wherein the valve portion includes:
   a regulator formed by a piston driven by a force corresponding to a pilot pressure which is a hydraulic pressure in a pilot chamber and a biasing portion which biases the piston in a direction opposite to a direction in which the piston is driven by the force corresponding to the pilot pressure thereby to adjust the flow-rate of the fluid relative to the hydraulic pressure chamber by a movement of the piston,
   a pressure increasing valve disposed between a high pressure source and the pilot chamber; and
   a pressure decreasing valve disposed between a low pressure source and the pilot chamber, wherein
   the control portion outputs the control current to the pressure increasing valve and the pressure decreasing valve, and
   the initial state is a state that the piston is biased by the biasing portion to be positioned to a predetermined initial position.

3. The hydraulic pressure control device according to claim 2, wherein
the regulator includes a spool valve mechanism configured to include a sleeve portion and a spool and an lap area where the actual pressure is not affected by the pressure increasing control or the pressure decreasing control when a holding control where the actual pressure is held is switched over to the pressure increasing control or the pressure decreasing control, and wherein,
the judging portion judges whether or not the pressure increasing control or the pressure decreasing control is in the lap area, and
in a case in which the pressure increasing control or the pressure decreasing control is judged to be executed in the lap area by the judging portion, as the threshold time, the correcting portion adopts an lap threshold time which is set to be a value different from the threshold time in a case in which the pressure increasing control or the pressure decreasing control is not judged to be executed in the lap area by the judging portion and executes the correction of the control current when the reaction time of the actual pressure relative to the pressure increasing control or the pressure decreasing control exceeds the lap threshold time.

4. The hydraulic pressure control device according to claim 1, wherein the correcting portion executes the correction such that the longer an elapsing time from a time when the reaction time exceeded the threshold time, the larger the correcting amount of the correction increases.

5. The hydraulic pressure control device according to claim 1, wherein the correcting portion discards the correcting amount adopted in a control in the idle area when the control in the idle area is shifted to the control in other area.

6. The hydraulic pressure control device according to claim 3, wherein when the control in the lap area is shifted to a control in a normal area which is not the idle area or the lap area, the correcting portion continues to adopt the correcting amount adopted in the control in the lap area to the normal area.

\* \* \* \* \*